United States Patent [19]
Bratkowski

[11] 3,830,556
[45] Aug. 20, 1974

[54] REAR PROJECTION SCREEN

[76] Inventor: Yaroslav Russell Bratkowski, 113 W. Kings Rd., North Vancouver, B.C., Canada

[22] Filed: Dec. 1, 1972

[21] Appl. No.: 311,129

[30] Foreign Application Priority Data
Dec. 15, 1971   Great Britain .................... 58243/71

[52] U.S. Cl. ................................ 350/128, 350/167
[51] Int. Cl. ........................................... G03b 21/60
[58] Field of Search ............................ 350/128, 167

[56] References Cited
UNITED STATES PATENTS
| | | | |
|---|---|---|---|
| 2,292,152 | 8/1942 | Newcomer | 350/128 |
| 2,338,654 | 1/1944 | MacNeille | 350/128 |
| 2,870,673 | 1/1959 | Schwesinger | 350/128 |
| 3,191,495 | 6/1965 | Miller | 350/128 |
| 3,523,717 | 8/1970 | Glenn, Jr. | 350/128 |

*Primary Examiner*—Samuel S. Matthews
*Assistant Examiner*—Richard A. Wintercorn
*Attorney, Agent, or Firm*—Staas, Halsey & Gable

[57] ABSTRACT

A rear projection screen has an array of individual lenses for transmitting to a viewing field light projected onto the rear of the screen. To provide a predetermined distribution pattern of the light intensity, each lens has a lens surface composed of surface portions which each have a shape individually determined in accordance with the pattern and which are combined to produce the pattern. The light may be distributed uniformly over the viewing area.

19 Claims, 25 Drawing Figures

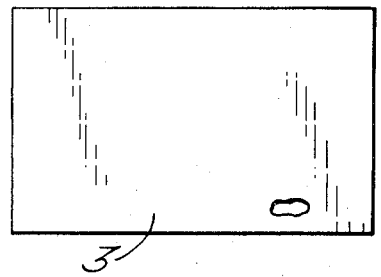
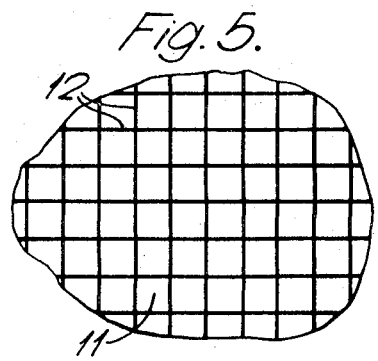
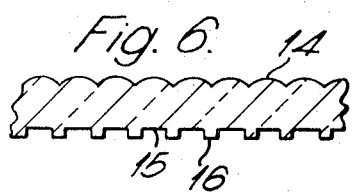
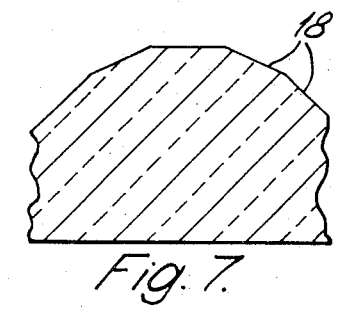
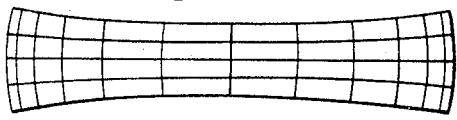
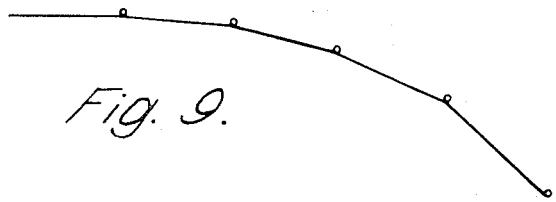
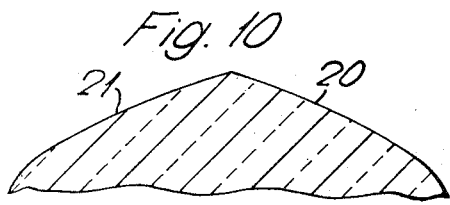
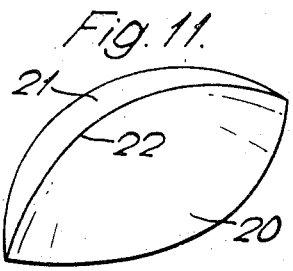

PATENTED AUG 20 1974

3,830,556

REAR PROJECTION SCREEN

The present invention relates to rear projection screens for use in displaying an image projected from an image source. Typical uses of the invention include showing of films or advertisements, a projected television image or a game score.

Such screens will often be employed, e.g., in the open air in daylight and it is then important firstly to utilize efficiently the light projected from the image source and secondly to reduce the transmission of both light reflected internally within the screen and of ambient light reflected from the screen. In this way, definition and contrast of the image displayed on the screen can be improved.

It has previously been proposed to provide a rear projection screen having lenticular focussing lens components on the rear side of the screen for focussing onto the front side light reflected by a mirror from a projector onto the rear side of the screen, and refracting lens components in optical registry with the focussing lens components, the refracting lens components being provided on the front side of the screen or incorporated with the focussing lens components on the rear of the screen.

More particularly, in the prior proposal the focussing lens components have a cylindrical or spherical curvature and the refracting lens components are also formed with cylindrical curvatures or as Fresnel lenses.

Moreover, to enable separate control of the vertical and horizontal viewing angles, it has been proposed to provide cylindrical lenses on respective screens with the lenses on one screen perpendicular to those on the other, the lenses having different radii of curvature. Alternatively, to provide a unitary projection screen, it has been proposed to make the rear face lenticulated in a spherical lens configuration and to incorporate refracting lens components in both the front and rear sides of the screen.

While this prior proposal provides some control of the viewing angle or angles, it fails to appreciate the importance of correct distribution of light intensity over these angles.

Thus, employing a cylindrical or spherical lens component has the disadvantage that the intensity of the light refracted thereby is concentrated in the central region of the viewing angle of the screen.

Consequently, viewers at the extremities of an audience field covered by the light refracted from the screen will receive less intense light than those in the central region of the audience field, with the result that the image may not be distinctly visible from the extreme regions of the audience field.

To overcome this disadvantage, it is desirable to be able to provide uniform distribution of light over the audience field or to provide higher intensity distribution to one or more preselected regions of the audience field than to the remainder of the audience field, depending upon the particular location, extent and layout of the audience field in any particular case.

It is, therefore, an object of the present invention to provide a rear projection screen which enables the distribution of intensity of the projected light transmitted by the screen to be preselected.

Accordingly, the present invention provides a rear projection screen, having a rear side for receiving thereon light projected from an image source; a front side for displaying thereon an image of the projection on said rear side; a lens formation on at least one side of said front and rear sides for deflecting the projected light; said lens formation forming an array of individual lenses distributed over said screen; each of said lenses comprising a plurality of lens surface portions each having a shape individually determined in dependence on a corresponding portion of a selected desired light intensity distribution pattern; and each of said lenses comprising a combination of said plurality of surface portions forming at least one lens surface so as to distribute in accordance with said light intensity distribution pattern the projected light which passes through said lens surface.

The present invention further provides a method of making a rear projection screen by forming a transparent screen with a lens formation for deflecting projected light passing through the screen, the lens formation forming an array of individual lenses distributed over the screen, which include selecting a desired light intensity distribution pattern for each of said lenses, determining the shapes of each of a plurality of lens surface portions in dependence on corresponding portions of said light intensity distribution pattern, and combining said shapes to form each of said lenses so as to produce said light intensity distribution pattern.

The invention will be more readily understood from the following description of preferred embodiments thereof with reference to the accompanying diagrammatic drawings, in which:

FIG. 4 shows the front side of the screen of FIG. 1;

FIG. 5 shows an enlarged portion of the front side shown in FIG. 4;

FIG. 6 shows a broken-away view in cross-section through a portion of the screen of FIG. 1;

FIG. 7 shows a broken-away view in cross-section through a lens forming part of a screen embodying the present invention;

FIG. 8 shows a plan view of an audience field for receiving light from the lens of FIG. 7;

FIG. 9 is a diagram illustrating one method for deriving a lens surface shape embodying the present invention;

FIG. 10 shows a broken-away view in cross-section through a further lens embodying the present invention;

FIG. 11 shows a view in perspective of the lens of FIG. 10;

In order to facilitate understanding of the embodiments of the invention illustrated in the accompanying drawings, the general arrangement and operation of a projection assembly employing a rear projection screen embodying the present invention will first be described, and then the shapes of various lens surfaces which may be employed in the screen, and methods of deriving these shapes, will subsequently be described.

Figure 1:
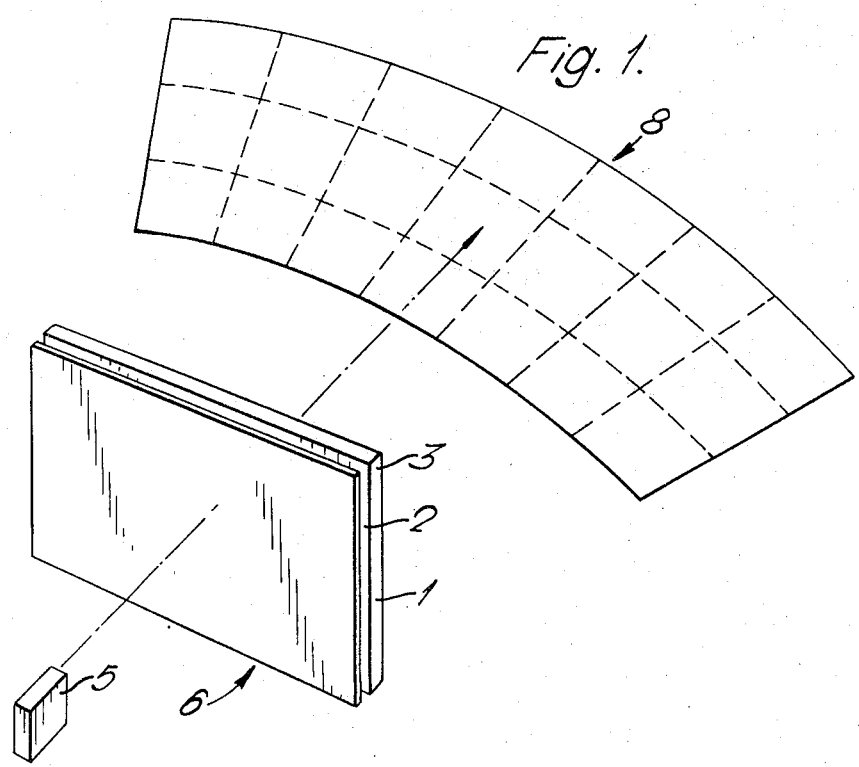
FIG. 1 shows a view in perspective of an image projection arrangement.

In FIG. 1, there is illustrated a large vertical optical screen 1, which has a rear face 2 and a front face 3. A projector 5 is arranged to project an optical image on the rear face 2 of the screen 1 through an optical system indicated generally by reference numeral 6.

The optical system 6 comprises two Fresnel lenses, which each comprises parallel lens components and which are arranged with the lens components of one Fresnel lens at right angles to the other, for converting the divergent light rays from the projector 5 into parallel rays which pass to the rear surface 2 of the screen 1. The Fresnel lenses are described hereinafter with reference to FIG. 25.

An image produced on the front face 3 of the screen 1, as described in greater detail below, is viewed by an audience dispersed over an audience area indicated generally by reference numeral 8. In the present case, the viewing field 8 is an open space in which automobiles containing viewers can be parked, but it will of course be understood that in other cases this viewing area may comprise an area provided with seats and divided by aisles or pathways and may, for example, be part of a sports arena or may be indoors.

The screen 1 is suitably constructed and braced to withstand the forces it is liable to encounter in use, for example, from wind.

Figure 2:
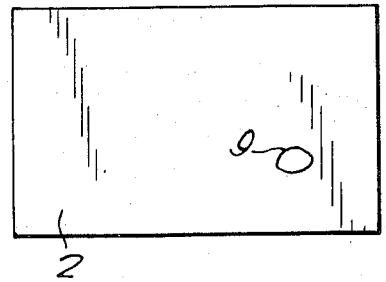
FIG. 2 shows the rear side of a screen forming part of the arrangement of FIG. 1.
Figure 3:
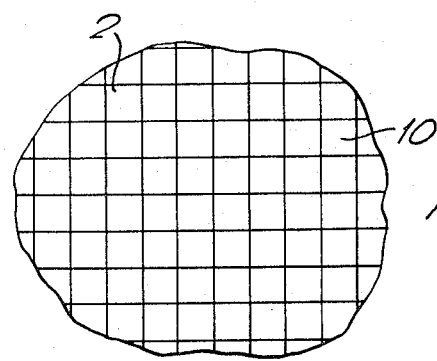
FIG. 3 shows an enlarged portion of the rear side shown in FIG. 2.

FIG. 2 shows a diagrammatic view of the rear side 2 of the screen, while FIG. 3 shows an enlarged view of a portion 9 of the rear side 2. Similarly, FIG. 4 shows a diagrammatic view of the front side of the screen, and FIG. 5 shows an enlarged view of a portion 7 of the front side of the screen. As can be seen from FIG. 3, the rear side 2 of the screen is divided into numerous small areas 10 which are shown in FIG. 3 as being square in shape and contiguous with one another. Each of the areas 10 is occupied by a lens which is arranged to focus the parallel light from the optical system 6 onto a quasi-focal plane which, in this example, is coincident with the front side 3 of the screen 1. By means of these lenses, the light incident on the areas 10 is concentrated into corresponding, mutually spaced, smaller areas 11 (FIG. 5) on the front side 3 of the screen 1. In this way, the light is separated into separate homogeneous portions passing through respective areas 11. Since the light is concentrated into smaller areas at the front of the screen, there will be unilluminated areas or zones 12 over the front face of the screen separating these illuminated areas 11. The unilluminated areas 12 are provided with a mask of light-absorbent material in order to reduce reflection at the front side 3 of the screen and thus to avoid reduction in the contrast of the image displayed on the front side 3.

It will be appreciated that the size of the areas 11 on the front of the screen is such that, at the viewing distances involved, the division of the projected image into the separate small areas 11 at the front of the screen is not visible to a viewer positioned in the viewing field 8.

It will be readily apparent that the visibility of the image displayed on the front side 3 of the screen will be enhanced if as much as possible of the light emitted from the projector 5 is transmitted to the viewing field 8, i.e., if the amounts of light reflected internally within the screen and transmitted to an area outside the viewing field 8 are minimized. Moreover, it is desirable for the intensity of the light transmitted from the front side 3 of the screen 1 to the viewing field 8 to be suitably distributed to ensure that sufficiently intense light reaches the extremities of the field 8 for enabling viewers there distinctly to view the image on the front side 3, thus avoiding excess concentration of the light in one region of the audience field 8 and insufficient transmission of light to other regions of the audience field 8.

For this reason, the lenses in the screen 1 are shaped so that each provides a predetermined distribution of the intensity of the light passing therethrough to the audience field 8. FIG. 6 shows a broken-away view in cross-section through one possible form of the screen 1, which in this case has on its rear side a lens formation comprising an array of convex lens surfaces 14, and on its front face a lens formation comprising an array of convex lens surfaces 15, occupying the areas 11 and separated by a mask 16 of light absorbent material. The structure of the individual lenses forming the screen of FIG. 6 is illustrated in greater detail in FIG. 24 and described hereinafter.

The mask 16 absorbs, and reduces reflection of, daylight or other ambient light falling on the regions 12 between the areas 11. It is found that in practice the mask 16 between the illuminated areas 11 is not perceived by the human eye provided that the sizes of the individual lenses, the width of the mask extending between the individual lenses and the distance of the viewer from the screen are such that the eye of the viewer is unable to resolve the spots of light emitted from the individual lenses as separate. While this feature of the screen is not essential, it may be desirable depending on the intended usage of the screen, and accordingly it may, for some applications of the invention, be desirable deliberately to design the screen so that the individual lenses are sufficiently small to ensure that the individual light spots are not resolved by the viewer at the intended viewing distance from the screen. Examples of the materials which can be used to form the mask 16 are black paint, dark coloured glass, dark coloured plastic, photographic silver halide emulsion, optical coatings and dark coloured anodized metals.

Several different approaches may be employed in deriving or determining the shapes of the lens surfaces used on the screen 1. In one such method, the audience field 8 is partitioned into a number of sub-regions which each require the same amount of light but which are not necessarily of the same area or shape. The lines in FIG. 8 indicate such a partitioning of the audience field.

FIG. 7 shows a cross-section through one form of lens which can be provided in each of the areas 10 of the screen. The lens shown in FIG. 7 has a plurality of facets 18 which are respectively associated with the above-mentioned sub-regions of the audience field 8 in such a way that the light transmitted through each of the facets 18 of this lens passes to a respective one of those sub-regions. The size, angle and surface shape of each of the facets 18 are determined so that the light refracted therethrough will produce the desired intensity of illumination within the corresponding sub-region of the audience field 8.

The required angle for each facet required to produce this effect can be readily calculated from Snell's Law.

The areas of the facets, relative to one another, can be calculated by assuming that each of these areas is measured as its projection on a plane perpendicular to the direction of the light incident on the lens, and that the sub-regions of the audience field respectively associated with the facets receive equal amounts of light. The facet areas are then proportional to $$(1 - R_T) M$$

where $R_T$ is the total fraction of the light intensity reflected as the light passes through the two surfaces of the lens and $M$ is the rate of variation of the entrance and exit rays, as described in more detail below.

The well-known Fresnel equation which represents the amount R of light reflected from a transparent refractive medium is:

$$R = 100/2 \, [\sin^2(i-r)/\sin^2(i+r) + \tan^2(i-r)/\tan^2(i+r)]$$

where $i$ and $r$ are the angles of incidence and refraction of a ray passing through a refracting surface. This equation is applicable each time the ray enters or exits from a refractive medium. $R_T$, the total amount of light reflected as the ray passes through two refracting surfaces, as in the present case, may be represented as $$R_T = 1 - [(1 - R_1)(1 - R_2)]$$

where $R_1$ and $R_2$ respectively represent the reflection losses at the two refracting surfaces, i.e., the entrance and exit surfaces of the lens.

Alternatively, $R_T$ may be more accurately calculated from:

$$R_T = [R_{TA} + R_{TB}]$$

where $R_{TA}$ and $R_{TB}$ are the total reflection losses in two different polarization planes, and $$R_{TA} = 1 - [(1 - R_{A1})(1 \, i - R_{A2})]$$
$$R_{TB} = 1 - [(1 - R_{B1})(1 - R_{B2})]$$

$R_{A1}$ being the reflection loss at the entrance surface in one polarization plane, etc. and where $$R_{A1} = 100 \times \sin^2(i_1 - r_1)/\sin^2(i_1 + r_1)$$

and $$R_{B1} = 100 \times \tan^2(i_1 - r_1)/\tan^2(i_1 + r_1)$$

$i_1$ and $r_1$ being the angles of incidence and refraction at the entrance surface.

The factor M is the ratio $\Delta\theta/\Delta i$, where $\Delta\theta$ is the incremental change in the exit angle $\theta$ produced by a change $\Delta i$ in the angle of incidence. If the relationship between $\theta$ and $i$ is plotted on a graph, M is the slope of the resultant curve at any given angle.

Instead of varying the projected areas of the facets of the lens, as described above, it is alternatively possible to partition the audience field so that the light flux received by each sub-region of the audience field is proportional to the areas of the facets, which in this case all have the same projected area. FIG. 8 illustrates an audience field partitioned in this way into sub-regions.

FIG. 8 demonstrates that reflection losses are compensated for by assigning proportionately smaller areas to sub-regions laterally offset from the centre of the audience field than to those at the centre.

Preferably the facets are each curved, in accordance with calculations set out below, so as to provide uniform distribution of light intensity over the respective sub-regions of the audience field.

The use of a faceted lens, as described above, results in discontinuities between the facets and for this reason necessitates the use of complicated manufacturing techniques, such as use of the computer-controlled precision pantograph milling machine or a computer-controlled ion beam etching machine.

To facilitate the construction of the lens, an alternative method of calculation can be used which permits the lens elements to be formed with smooth (i.e., continuous) surfaces. The computations required are similar to those described above inasmuch as the factor ($1 - R_T$) is computed from the same equations. The difference lies in that values for this factor are computed for intervals representing radial distances from the centre (or optic) axis of the lens, whereas previously they were calculated for positions of each facet. In this way, the above correction factor is used to generate the desired curve of the lens surface.

FIG. 9 illustrates one method of generating such a curve from the correction factors:

$$(1 - R_T) KM,$$

where K is a geometric correction factor which relates areas in the plane of the screen to angular areas in the audience field.

When this alternative method is used, the range of angles of incidence needed to produce light over the audience field, i.e., to transmit light from the lens over a range of exit angles corresponding to the audience field, is divided into equal intervals, for example, 1° intervals in the vertical and horizontal planes. Assuming that one degree intervals are chosen, the factors ($1 - R_T$) KM are computed and are multiplied by (secant I) for each degree of incidence up to and including the maximum angle of incidence. Starting with zero angle of incidence, a horizontal line is drawn one unit in length and the product of all correction factors at zero incident angle is identified as $X_o$. Secondly, the factors are computed for a one degree angle of incidence and their product is identified as $X_1$, and a line of length $X_o - X_1$ is drawn with a 1° slope starting from the end of the previous line. By continuing in this way, a curve is approximated, made up of many line segments. Mathematically, such a technique may imply any number of divisions and thus be made to approach the exact shape to any desired degree of accuracy. Using computational variations, a smooth curve may be drawn through a greater number of end points to provide greater accuracy; or functions of the original equations may lend themselves to a method of integral calculus, whereby a function describing the actual curve may be deduced.

While the above-described method may be employed to produce a smoothly curved lens surface, it may be desirable, in certain circumstances, to provide a discontinuity, i.e., an abrupt change in direction of the curve of the lens surface. For example, there is shown in FIGS. 10 and 11 a lens having lens surfaces 20 and 21 which meet at a single line discontinuity 22. It will be evident that the result of this discontinuity is that the light transmitted through the lens will be directed to two separate, spaced areas forming separate audience fields, which may be desirable in cases where separate audience fields are provided on opposite sides of an area at which no light is required.

A further method of calculating the required lens surface shapes will now be described with reference to FIG. 12.

Figure 12:
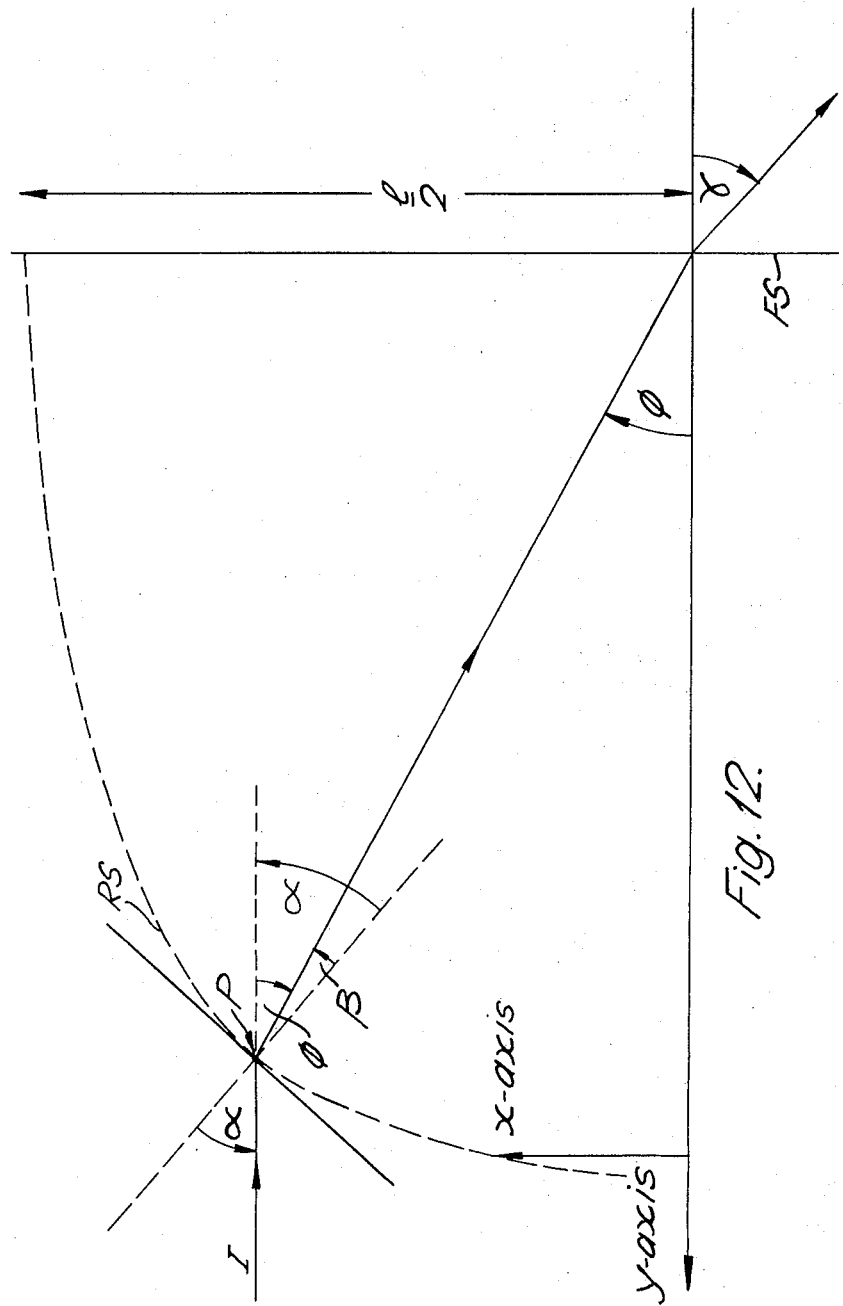
FIG. 12 shows a diagram illustrating a further method for deriving a lens surface shape embodying the present invention.

In FIG. 12, there is diagrammatically illustrated a lens having a rear surface RS, shown in broken lines, and a front surface FS, which is planar and perpendicular to the direction of the projected light incident on the rear surface RS. A ray I of this projected light is illustrated as passing through a point P on the rear surface RS, at which the normal N and tangent T are shown and the ray subtends angles of incidence and refraction $\alpha$ and $\beta$ respectively. The ray I subtends angles of incidence and refraction $\phi$ and $\gamma$ at the front surface FS. Thus, $\gamma$ may be regarded as the viewing angle of the ray, and is, of course, optically related to the slope, tan $\alpha$, of the rear surface RS at the point P.

The width of the lens is 1 and, assuming that the projected light is uniformly distributed over the rear surface RS, and dividing the lens width 1 into K increments $\Delta x$, each increment $\Delta x = 1/k$ will transmit the same amount of light as a corresponding increment $\Delta \gamma = \gamma/k$ of the viewing angle $\gamma$ for the case where the light is uniformly distributed over the viewing angle $\gamma$.

From Snell's Law, $$\phi = \sin^{-1} (\sin \gamma/n),$$

where $n$ is the refractive index of the lens.

Likewise, $\sin \alpha = n \sin \beta$.

From FIG. 12, it can be seen that $\alpha = \beta + \phi$

So that $\sin (\beta + \phi) = n \sin \beta$, and we can solve for $$\tan \beta = \sin \phi/n - \cos\phi$$

If $\gamma$ is known, $\phi$ and $\beta$, and consequently $\alpha$, can be calculated.

If P has the co-ordinates $x_i$, $y_i$, then the co-ordinates of point $x_{i+1}$, $y_{i+1}$, on the lens surface can be obtained, for example, by appropriately instructing a computer, as follows:

$$x_{i+1} = x_i + \Delta x$$

$$\gamma_{i+1} = \gamma_i + \Delta \gamma$$

$$y_{i+1} = y_i - \Delta y$$

$$\Delta y = \Delta x \tan\alpha$$

and $$\tan \alpha = \tan [\phi + \tan^{-1} (\sin \phi/n - \cos\phi)]$$

where $$\phi = \sin^{-1} (\sin \gamma/n)$$

Hence, knowing $\gamma$, $n$ and $\Delta x$, $\Delta y$ can be obtained, and thus the co-ordinates $x_{i+1}$, $y_{i+1}$.

It is also possible to take into account reflection losses at the two surfaces of the lens. Considering only un-polarized light and ignoring the small polarization due to refraction at the first surface, the above-quoted Fresnel equation can be written as $$r = \tfrac{1}{2} [\sin^2(\theta - \theta^1)/\sin^2(\theta + \theta^1) + \tan^2(\theta - \theta^1)/\tan^2(\theta + \theta^1)]$$

where $\theta$ and $\theta^1$ represent the angles of incidence and refraction, respectively.

The fraction of light transmitted is $t = 1 - r$. If the transmission co-efficients are $t_1$ and $t_2$ for the rear and front surfaces, respectively, then $t = t_1 t_2$ is the fraction of the light transmitted through the lens.

To obtain uniform illumination, the quality of light destined for each increment of the viewing angle can be modified by writing the $x$ increment as $$\delta x = \Delta x/t$$

i.e., if the transmission is small for a given angle, the amount of light entering the corresponding incremental element of the lens can be increased in inverse proportion.

It will be understood that $\delta x$ can be controlled so as to provide a specified non-uniform illumination distribution. Thus, the variation of the output intensity I of the light can be considered as a function of the viewing angle $\gamma$:

$$I_\gamma = I_0 f(\gamma)$$

where $I_o$ is the intensity at $\gamma = o$ and $f$ is a function of $\gamma$.

Consequently, to obtain the desired distribution, the increment $\delta x$ can be modified thus:

$$\delta x' (\gamma) = I(\gamma)/I_o \, \delta x = f(\gamma) \, \delta x$$

Thus, a prescribed light distribution can be obtained by suitable adjustment of the $x$-increments.

Figure 13:
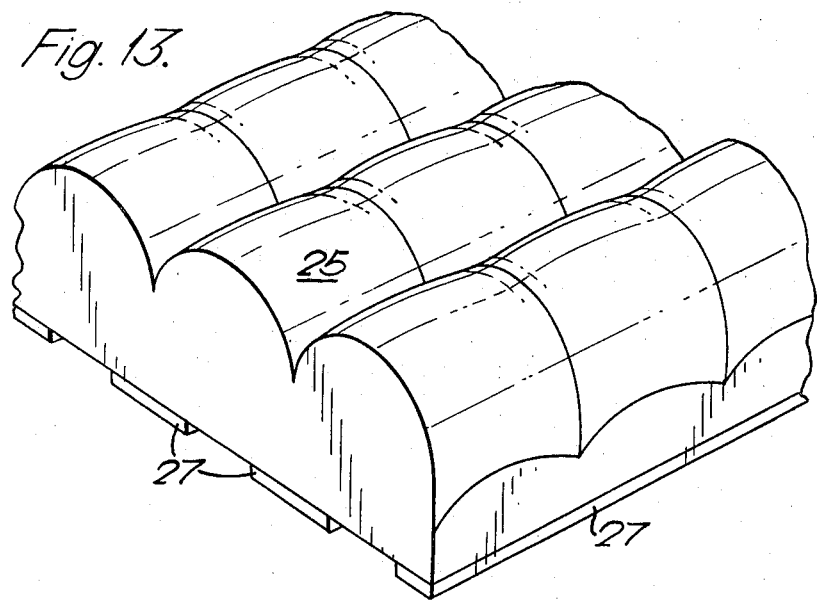
FIG. 13 shows a broken-away view in perspective of part of a further screen embodying the present invention.
Figure 14:
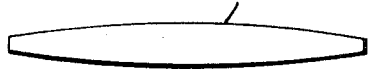
FIG. 14 shows a light distribution pattern corresponding to the screen of FIG. 13.

FIG. 13 shows a lens formation comprising an array of lenses 25, each of which merges smoothly into an adjacent lens 25 so as to form a plurality of parallel, undulating ribs. Each lens 25 has a curvature in one plane which is calculated to produce a desired horizontal spread of the light refracted thereby, and a different curvature in a perpendicular plane, for producing a different vertical spread of the light. These curves can be obtained from the previously described mathematical procedures. In this way, the light from a screen formed by the lenses 25 can be uniformly distributed over an audience field having the shape shown in FIG. 14, where a diagrammatically represented audience field is indicated by reference numeral 26.

FIG. 13 also shows portions of a mask 27 provided on the front surface of the screen and corresponding to the mask 16 of FIG. 6.

Figure 15:
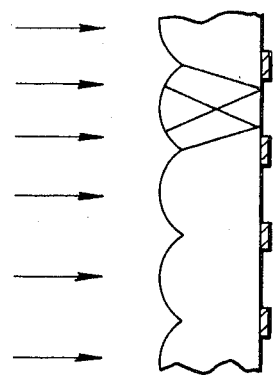
FIGS. 15 and 16 show broken-away views through two further screens embodying the present invention.
Figure 16:
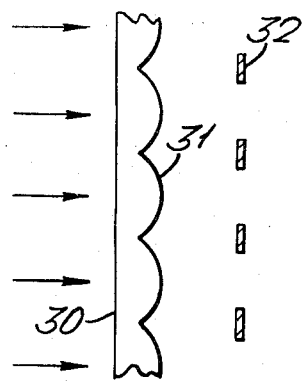

As shown in FIG. 15, the parallel light entering the rear side of the screen may be focussed by the lens formation on a quasi-focal plane coinciding with the front side 3 of the screen, on which the mask 16 is provided. However, the quasi-focal plane and the mask need not necessarily be provided on the front side of the screen, depending on the optical properties of the particular lens formation employed in any particular case. For example, as shown in FIG. 16, the screen may have a flat rear side 30 and a lens formation 31 on its front side for focussing the parallel rays at a quasi-focal plane spaced forwardly of the front side of the screen, in which case an appropriately apertured mask 32 may also be disposed forwardly of the front of the screen and coincident with the quasi-focal plane.

Figure 17:
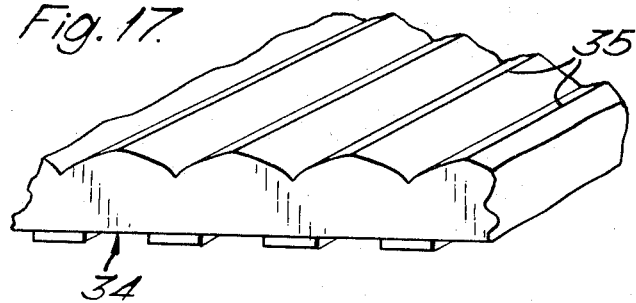
FIGS. 17, 18 and 19 show broken-away views of three further screens embodying the present invention.

While in the embodiments of the invention described above the screen comprises a plurality of individual lenses, each corresponding to one of the areas 10 of the screen, as shown in FIG. 3, it is also possible to combine the lenses to form a plurality of parallel linear ribs extending across the screen. For example, as shown in FIG. 17, a screen indicated generally by reference numeral 34 may be formed on its rear side with parallel linear ribs 35. The ribs 35 are shown as having a transverse cross-section corresponding to that illustrated in FIG. 10, i.e., each rib has along its summit a single line discontinuity, so that the ribs 35 will each direct the light impinging thereon to two separate areas of the audience field.

Figure 18:
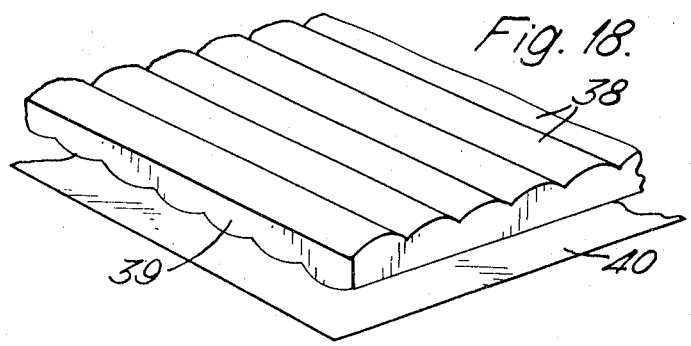

Clearly, a single set of linear lenses, i.e., ribs having a constant cross-section along their length, will control the spread of light from the front face of the screen in directions parallel to only one plane, for example the horizontal or vertical plane. To provide control of the light in two planes at right angles to one another, the screen may be provided with linear ribs on opposite sides thereof, the ribs on one side of the screen being at right angles to those on the other side of the screen, as shown in FIG. 18, in which the two sets of ribs are indicated by reference numerals 38 and 39 respectively. In this case, the light may be focussed by the screen on a quasi-focal plane indicated by reference numeral 40.

Figure 19:
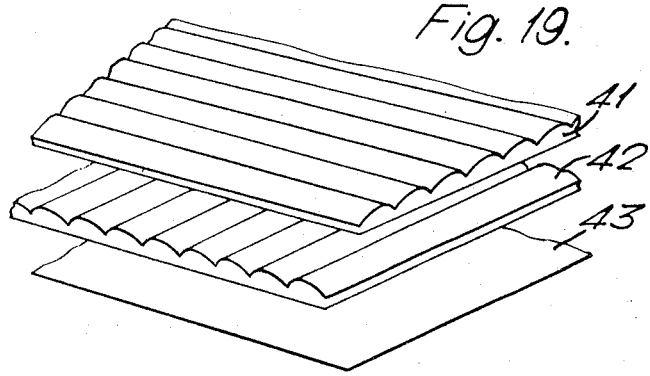

Instead of providing the two sets of ribs on opposite sides of the screen, the latter may be formed as a composite screen, as shown in FIG. 19, having one set of parallel linear ribs 41 provided on one layer, which is spaced from a second layer on which parallel linear ribs 42 extend at right angles to the ribs 41. In this case, the quasi-focal plane is indicated by reference numeral 43.

Figure 20:
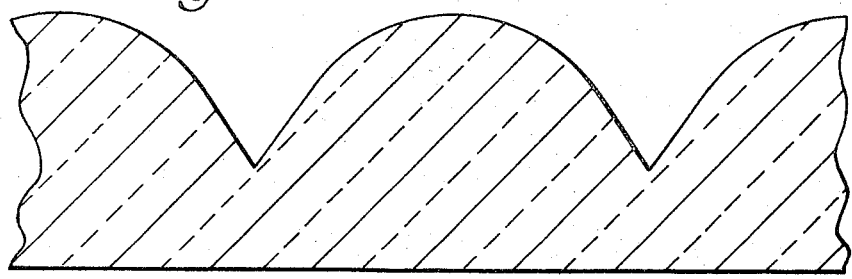
FIGS. 20 to 23 show broken-away views in cross-section through four further screens embodying the present invention, and illustrate various possible lens formations.
Figure 21:
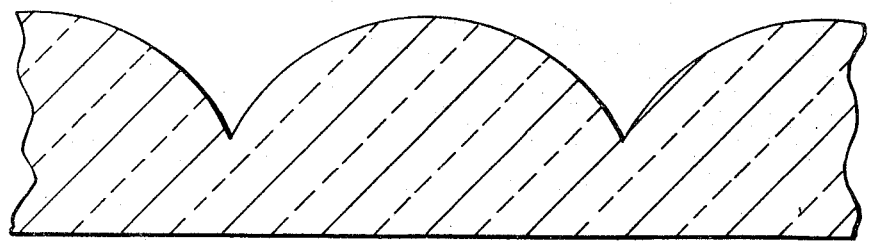

While the method of calculating the shapes of the lens surfaces described above with reference to FIG. 12 can be employed as described to provide uniform illumination of the audience field, it is also possible to employ that method to provide uneven illumination of the audience field. For example, it may be required to provide greater light intensity at a region of the audience field further spaced from the screen that other regions of the audience field, or to provide greater illumination at the lateral extremities of the audience field. This can be accomplished by choosing varying increments, instead of equal increments, of the angle of incidence in the calculations described above with reference to FIG. 12. For example, the lens shape shown in FIG. 20 has, in relation to that shown in FIG. 21, a smaller radius of curvature at the central portion of each lens. In fact, FIG. 37 diagrammatically illustrates a lens shape for providing uniform light intensity throughout the audience field, although it is emphasized that this figure is merely diagrammatic and is not intended accurately to depict the lens curvature required for such uniform light distribution. In contrast, the lens shape shown in FIG. 21, as a result of the lens surface curvature being substantially less towards the optic axis of each lens, will provide greater brightness at the centre of the audience field. Conversely, by employing a progressively smaller radius of curvature as in the case in the optic axis of each lens than that shown in FIG. 20, less brightness can be transmitted to the centre of the audience field until eventually an abrupt discontinuity of the lens slope, as described above with reference to FIGS. 10 and 17, will produce a central dark area between two spaced illuminated audience fields.

Figure 22:
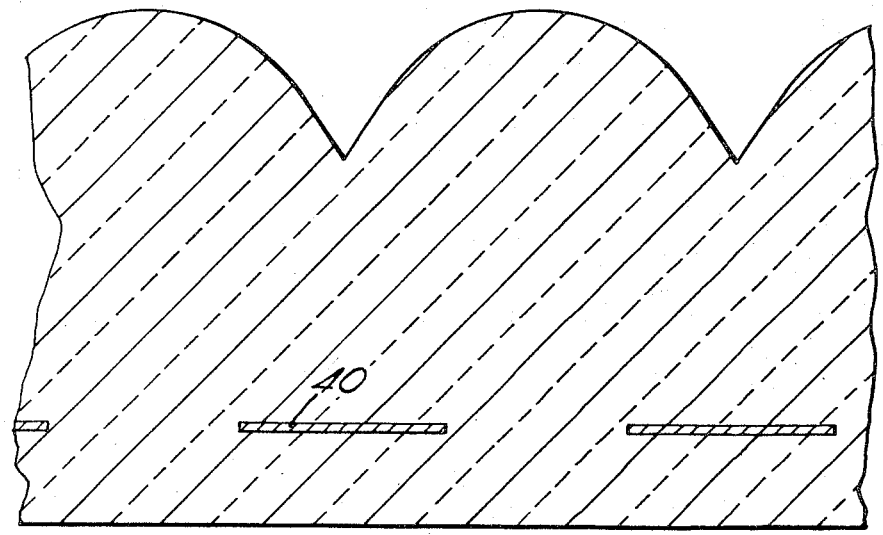

FIG. 22 illustrates an embodiment of the screen according to the present invention in which a mask 40, instead of being provided on a surface of the screen or spaced from the screen, is embedded within the screen. This has the advantage that if periodic washing of the screen is required for removing grime, the mask does not become worn away during such washing. Also, the mask is protected from the weather and any chemical pollutants in the atmosphere.

Figure 23:
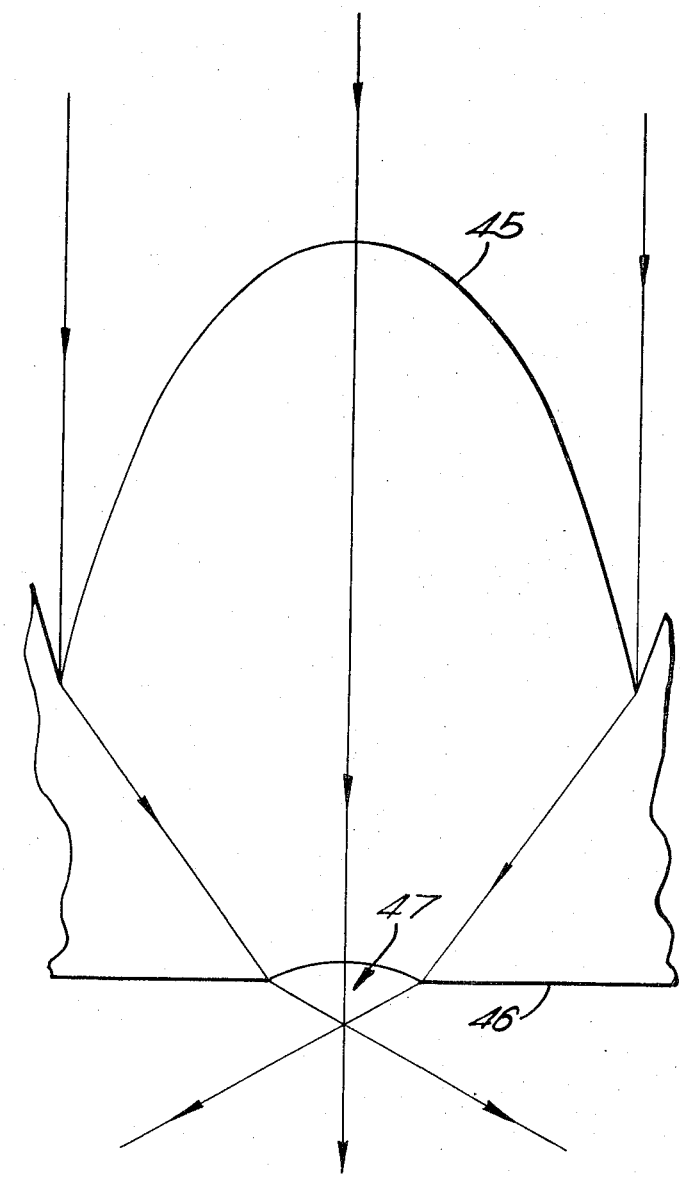

As mentioned above, the efficiency of the screen depends not only on reduction of reflection of ambient light from the front face of the screen but also on reduction of transmission from the front of the screen of light which has been internally reflected within the screen. Clearly, the mask will prevent transmission of internally reflected lights through the areas of the front of the screen occupied by the mask. However, the efficiency of the screen can be further increased by reducing the occurence of such internal reflection. This may be achieved by employing a lens formation such as that illustrated in FIG. 23. In this lens formation, the rear side of the screen has formed thereon a lens surface 45 for refracting and appropriately focusing the parallel light incident on the rear side of the screen. The front side of the screen is provided with a mask 46, which as shown, is interrupted by open areas to allow transmission, therethrough of the rays refracted by the lens surface 45. At these open areas, which lie on the optic axis of the lens, the front side of the screen is formed with a recess having a concave curved surface 47. This curved surface 47 is defined as that surface to which normals erected at any point on the surface 47 bisect the angle made by the most extreme incident rays (i.e., the incident rays having the greatest difference in incident angle between them) passing through that point.

Figure 24:
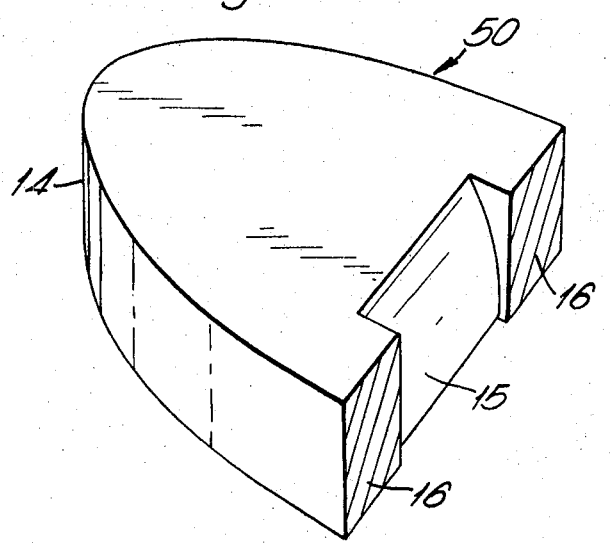
FIG. 24 shows a view in perspective of a single lens which forms part of a screen according to the preferred embodiment of the present invention.

FIG. 24 illustrates a preferred embodiment of the invention.

More particularly, FIG. 24 shows an individual lens, indicated generally by reference numeral 50, intended from one of an array of lenses in the rear projection screen of FIG. 6.

The curved rear lens surface 14 controls the horizontal spread of the light from the front of the screen. It will be understood that the curved lens surface 14 forms portion of the surface of one of a plurality of parallel linear ribs on the rear face of the screen.

The front of the lens 50 has the curved lens surface 15 which, for controlling the vertical spread of the light from the front of the screen, is curved in a vertical plane, i.e., in a plane perpendicular to that of the lens surface 14. The curvatures of the lens surfaces 14 and 15 required to produce a preselected light intensity distribution pattern in the light spreading from the front of the screen are calculated as described above.

It will be seen that the lens surface 15 at the front of the lens 50 is recessed into the front face of the lens. This recessing of the curved lens surface 15 facilitates the application of a mask 16 to the front surface of the lens 50.

Figure 25:
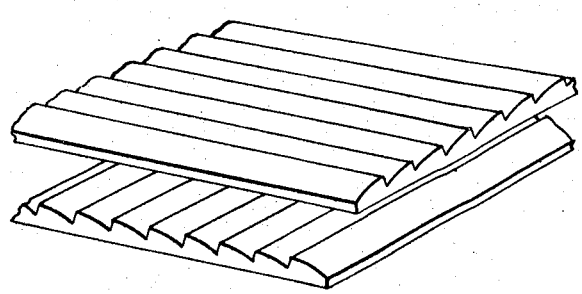
FIG. 25 shows a broken-away view in perspective of two Fresnel lens screens forming part of the projection arrangement of FIG. 1.

FIG. 25 shows parts of a pair of Fresnel lenses 54, 55 forming the optical system 6 of the FIG. 1 for converting the divergent light projected from the image projector 5 into parallel light. As can be seen, each of the Fresnel lenses 54, 55 comprises a screen formed by a plurality of parallel linear ribs 56. The ribs 56 of the lens 54 are arranged to extend in a direction at right angles to those of the lens 55, so that the light which passes through the thus-crossed Fresnel lenses 54, 55 is refracted in two planes at right angles to one another, e.g., the horizontal and vertical planes. The linear ribs of the Fresnel lenses have the shapes of sectors of a cylindrical lens surface divided by parallel planes to form the sectors, which are then displaced to lie in a common plane.

The Fresnel lenses 54, 55 and those of the above-described screens which comprise parallel linear lenses are preferably of metal workpiece, and then casting the screens in sections, which are subsequently held together in edge-to-edge relation. After planing or otherwise cutting the workpieces, the formation of the moulds is completed by polishing and, if necessary, retouching the mould surfaces. The screens are preferably cast from an acrylic plastics material.

The present invention further provides image display apparatus, comprising an image projector, means for converting divergent light from said projector into parallel light, and a rear projection screen for receiving the parallel light on the rear thereof and transmitting the light from the front thereof, wherein said light converting means comprise first and second light deflecting screens, and each of said first and second light deflecting screens comprises a plurality of parallel linear lenses, the lenses on said first light deflecting screen extending at an angle to those on said second light deflecting screen.

The embodiments of the invention in which an exclusive property or privilege is claimed are defined as follows:

1. A rear projection screen for transmitting light in a predetermined light intensity distribution to a viewing area of predetermined size and shape, said rear projection screen having:
    a rear side for receiving thereon light projected from an image;
    a front side for displaying said image thereon; and
    a lens formation on at least one of said front and rear sides for refracting the projected light to the viewing area;
    said lens formation forming an array of individual lenses distributed over said screen and each shaped to refract light to the whole of the viewing area;
    each of said lenses comprising a plurality of lens portions for selectively projecting areal portions of the image through respective ones of said lens portions to respective areal portions of the viewing area; and
    each of said individual lens portions comprising means for controlling the intensity of the light transmitted therethrough to the respective areal portion of the viewing area, said control means comprising at least one lens surface portion having a shape which is individually predetermined, whereby the light intensity control is effected by said shape.

2. A rear projection screen as claimed in claim 1, wherein each of said lenses comprises a first lens surface formed on one side of said screen and curved in a first plane, and a second lens surface formed on the other side of said screen and curved in a second plane extending at an angle to said first plane, said first and second lens surfaces being formed by different ones of said lens surface portions to provide different light intensity distributions along said first and second planes.

3. A rear projection screen for transmitting light in a predetermined light intensity distribution to a viewing area of predetermined size and shape, said rear projection screen having:
    a rear side for receiving thereon light projected from an image source;
    a front side for displaying said image thereon; and
    a lens formation on at least one of said front and rear sides for refracting the projected light to the viewing area;
    said lens formation forming an array of lenses distributed over said screen and each shaped to refract light to the whole of the viewing screen;
    each of said lenses comprising a plurality of lens portions for selectively projecting areal portions of the image through respective ones of said lens portions to respective areal portions of the viewing area; and
    each of said individual lens portions having at least one lens surface portion the dimensions of which are individually determined to control the amount of light transmitted through the respective lens portion to the respective areal portion of the viewing area.

4. A rear projection screen as claimed in claim 3, wherein each of said lenses comprises a first lens surface formed on one side of said screen and curved in a first plane, and a second lens surface formed on the other side of said screen and curved in a second plane extending at an angle to said first plane, said first and second lens surfaces being formed by different ones of said lens surface portions to provide different light intensity distributions along said first and second planes.

5. A rear projection screen as claimed in claim 3, wherein said individually determined lens surface portions vary incrementally in curvature across each of said lenses to provide uniform distribution of light intensity across the exit angles of each of said lenses.

6. A rear projection screen as claimed in claim 3 wherein said lens formation comprises first parallel linear lens formations formed on one side of said screen and second parallel linear lens formations formed on the other side of said screen at an angle to said first parallel ribs.

7. A rear projection screen as claimed in claim 3 wherein said lens formation comprises parallel ribs formed on one side of said screen and each comprising a succession of convex lens surfaces, each of which has a curvature which varies longitudinally and transversely of the respective rib.

8. A rear projection screen as claimed in claim 3, wherein said lens surface portions form lens facets, each of said facets having a curvature which varies to provide uniform intensity distribution of light passing through said facet.

9. A rear projection screen as claimed in claim 3, wherein said lens surface has a curvature which alters abruptly at least one line of discontinuity.

10. A rear projection screen as claimed in claim 3, wherein said lens formation extends over said rear side of said screen, and recesses formed on said front side of said screen for reducing internal reflection within said screen are optically aligned with said lens formation, a mask being provided on said front face and extending between said recesses, said mask comprising light-absorbant material and presenting open areas for the passage of the projected light through the mask.

11. A rear projection screen as claimed in claim 10, wherein said mask is embedded within said screen.

12. In a method of making a rear projection screen by forming a transparent screen with a lens formation for refracting projected light passing from an image through the screen to a viewing area, which method includes forming the lens formation as an array of lenses distributed over the screen, shaping each of said lenses to refract light to the whole of the viewing area and forming each of said lenses with a plurality of lens surface portions for selectively projecting areal portions of the image through respective ones of said lens portions to respective areal portions of a viewing area, the improvement comprising the steps of individually determining the shapes of each of said lens surface portions in accordance with the light intensity to be transmitted through each of said lens surface portions to the respective areal portions of the viewing area, and incorporating said lens surface portion shapes in said lenses.

13. A method as claimed in claim 12, which includes determining the shapes of each of said surface portions in dependence on increments of the exit angles of each of said lenses.

14. A method as claimed in claim 12, wherein equal increments of said exit angle are chosen for determining said surface portion shapes in order to provide uniform intensity distribution from each of said lenses.

15. A method as claimed in claim 12 wherein said surface portions are combined as a first lens surface on one side of said screen and a second lens surface on the other side of said screen, said first lens surface having a shape different from that of said second lens surface, said first lens surface being curved in a first plane and said second lens surface being curved in a second plane extending at an angle to said first plane.

16. A method as claimed in claim 12 which includes providing a mask of light-absorbant material on the front side of said screen, said mask being formed with open areas for the passage of light therethrough from said lenses.

17. A method as claimed in claim 12 which includes forming each of said lenses with a plurality of facets, and determining the area of each of said facets in dependence on said light intensity distribution pattern.

18. A method as claimed in claim 12, which includes forming each of said lenses with a lens surface having an abrupt change in curvature along a line of discontinuity.

19. Image display apparatus, comprising an image projector, means for converting divergent light from said projector into parallel light, and a rear projection screen for receiving the parallel light on the rear thereof and transmitting the light from the front thereof, wherein said light converting means comprise first and second light deflecting screens, and each of said first and second light deflecting screen comprises a plurality of parallel linear Fresnel lenses, the lenses on said first light deflecting screen extending at an angle to those on said second light deflecting screen.

* * * * *